United States Patent [19]

Higo et al.

[11] Patent Number: 4,596,642
[45] Date of Patent: Jun. 24, 1986

[54] PROCESS AND APPARATUS FOR TREATING EFFLUENT GAS BY IRRADIATION WITH ELECTRON BEAMS

[75] Inventors: Tsutomu Higo; Shoji Mizutani, both of Chigasaki; Yasuhiro Sawada, Fuchu; Katsumi Kengaku, Kitakyushu, all of Japan

[73] Assignees: Ebara Corporation; Japan Iron & Steel Federation, both of Japan

[21] Appl. No.: 690,503

[22] Filed: Jan. 10, 1985

Related U.S. Application Data

[60] Division of Ser. No. 374,551, May 3, 1982, which is a continuation of Ser. No. 107,254, Dec. 26, 1979, abandoned.

[30] Foreign Application Priority Data

Dec. 29, 1978 [JP] Japan ................... 53-162152

[51] Int. Cl.$^4$ ................................. B01J 1/10
[52] U.S. Cl. ................... 204/157.3; 422/186; 55/138; 55/150; 250/492.3
[58] Field of Search .............. 422/186; 204/157.1 H, 204/164; 250/435, 438, 492.3; 55/138, 150

[56] References Cited

U.S. PATENT DOCUMENTS

| | | | |
|---|---|---|---|
| 1,215,451 | 2/1917 | White | 138/39 X |
| 3,655,965 | 4/1972 | Icre | 250/435 X |
| 3,833,814 | 9/1974 | Nablo | 250/497.3 |

FOREIGN PATENT DOCUMENTS 1016895 9/1977 Canada .
551124 12/1922 France .

Primary Examiner—John F. Terapane
Attorney, Agent, or Firm—Hall, Myers & Rose

[57] ABSTRACT

Irradiation treatment of an effluent gas by means of electron beams can be carried out efficiently by controlling the velocity and the velocity distribution of the stream of gas when it passes through a zone to be irradiated. Such control can be effected conveniently according to the present invention by first introducing the stream of gas into a velocity reduction zone and then leading it to a velocity re-accelerating and velocity distribution adjusting zone immediately before the thus adjusted stream of gas reaches the zone to be irradiated.

An apparatus suitable for practicing such process is also disclosed.

4 Claims, 8 Drawing Figures

PROCESS AND APPARATUS FOR TREATING EFFLUENT GAS BY IRRADIATION WITH ELECTRON BEAMS

This is a division of application Ser. No. 374,551, filed 5/3/82 which is a continuation application to U.S. Ser. No. 107,254, filed 12/26/79, abandoned.

This invention relates to a process for removing sulfur oxides ($SO_x$) and/or nitrogen oxides ($NO_x$) from effluent gases containing them under irradiation with electron beams and also relates to an apparatus for carrying out the same process.

It is known to irradiate effluent gases with radiations to convert $SO_x$ and/or $NO_x$ contained therein into solids or mist followed by removing these solids and mist by making use of a dust collector such as an electrostatic precipitator. It is also known to arrange a plural number of radiation sources along the outer periphery of a reactor which is placed in series with respect to the flow path of an effluent gas in order to irradiate the effluent gas in the direction perpendicular to the direction of the flow path so that the effluent gas may receive as even a dose as possible.

This type of process, however, still contains a number of problems to be solved. For example, when a large amount of an effluent gas is to be treated, several bends must be given to the duct used for transporting the effluent gas, with proper shields being given wherever necessary to cut off Bremsstrahlung X-rays coming from an irradiation zone and an electron beam accelerator.

When bends are given to an effluent gas transporting duct, there is likelihood of the occurence of channelling or uneven flow because of the inertia of the effluent gas. For example, if a bend is given to an effluent gas duct immediately before the duct reaches a reactor where irradiation is to be conducted, there appears a noticeable channelling or uneven flow in the stream of the effluent gas which flows within the reactor and the dose which the effluent gas receives is poorly balanced. [See FIG. 1a. In the same figure, (i) represents an inlet duct, (ii) represents a "reaction vessel" (a reactor in which the radiation-induced reaction is carried out), (iii) represents an electron beam accelerator and (iv) represents a zone in which irradiation of the effluent gas is to be carried out (hereinafter often referred to as "irradiation zones").]

In order to avoid the occurrence of such channelling or uneven flow as mentioned above, a straight pipe portion of satisfactory length is preferably given to a duct before it reaches the "irradiation zone" (as seen in FIG. 1b wherein (v) represents the straight pipe portion). However, if the length of a straight pipe portion increases, the area of portions to be shielded increases correspondingly. In addition, if an effluent gas is made to flow in the vertical direction, an apparatus for irradiation has to be installed at a high place. Thus, it is difficult from both technical and economic viewpoints to employ this manner of construction for the treatment of a large amount of effluent gases. It has also been proposed to place a porous board or a lattice within a duct some length ahead the entrance into the reaction vessel in order to regulate the flow of an effluent gas (as seen in FIGS. 1c and 1d wherein (vi) represents the porous board and (vii) represents the regulating lattice). This alternative is also defective in that the resulting pressure loss is significant and since aerosol particles contained in an effluent gas adhere to or deposit on the surfaces of the porous board or the lattice, there is even a possibility, after use for a long time, of bringing about a higher degree of channelling or uneven flow than in the case when no such porous board or lattice is used. The other alternative which has been proposed heretofore is to use a plural number of ducts which are joined together just before the entrance of a "reaction vessel" (as seen in FIG. 1e). This method is also defective in that there is a great difficulty in balancing the flow rates of the effluent gas passing through the different ducts, respectively, and further with many ducts there is a heavier degree of channelling or uneven flow than in the case when a single duct is used.

Accordingly, the object of this invention is to eliminate these defects inherent in the prior art processes and apparatuses for treating effluent gases and to provide a process and an apparatus for the same purpose free from the defects mentioned above.

The process and the apparatus of the present invention are characterized in that the velocity of a stream of an effluent gas is once decreased, and then the direction of the same stream is changed, with the velocity thereof being made to increase again simultaneously, before the same stream is introduced into the inside of a "reaction vessel" in order to thereby limit to the minimum the degree of channelling or uneven flow due to the inertia of the effluent gas.

In the following lines, the present invention will be explained in more detail with particular reference to the attached drawings (FIG. 2 and et seq.), illustrating by diagrams some preferred embodiments of the present invention.

Figure 1:
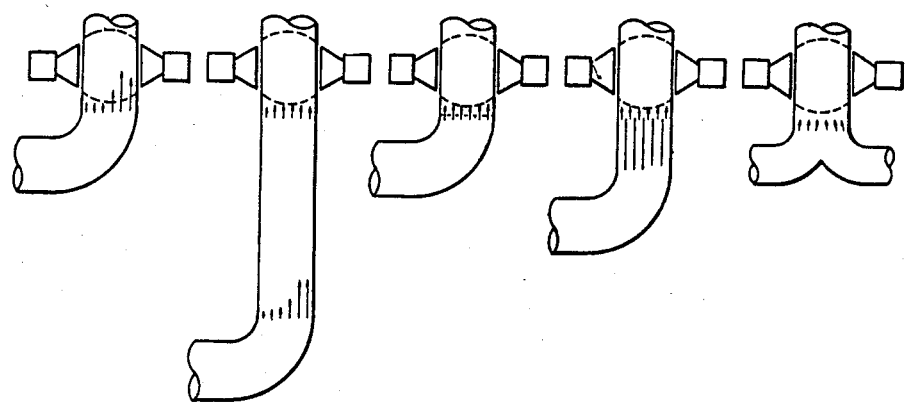
FIGS. 1a through 1e represent the rough sketch of the construction of prior art apparatuses for treating effluent gases under irradiation with electron beams.
Figure 2:
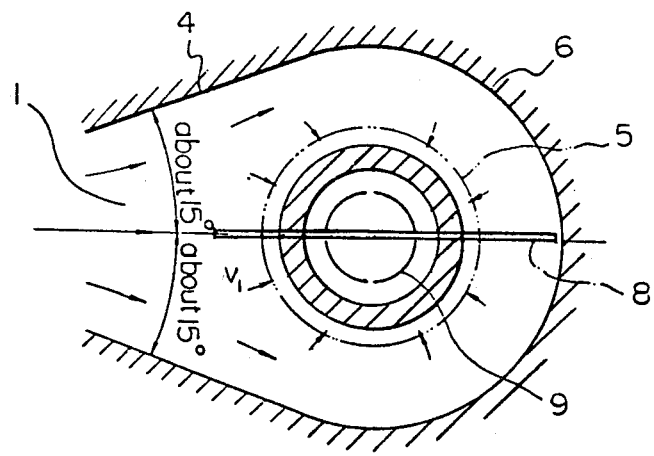
FIG. 2 shows the plan view of the construction of the apparatus of the present invention for treating effluent gases.
Figure 3:
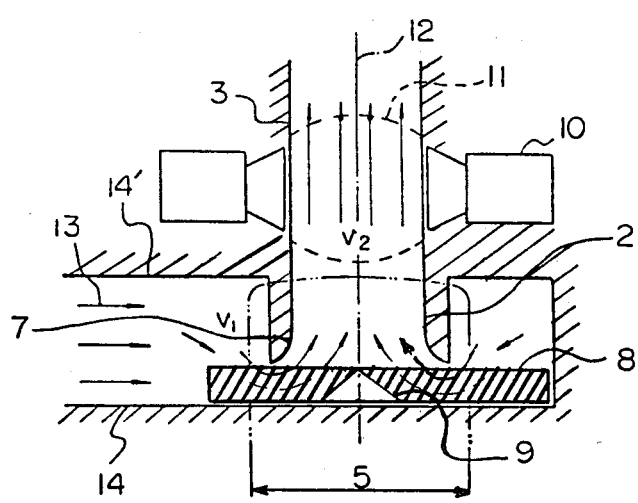
FIG. 3 shows the elevation of the same apparatus as shown in FIG. 2.

As is obvious from FIGS. 2 and 3, the apparatus of the present invention for treating effluent gases under irradiation with electron beams essentially comprises a chamber for reducing the velocity of gas flow 1, a gas flow accelerating-and-adjusting portion 2 and a "reaction vessel under irradiation with electron beams" 3.

The velocity reduction chamber 1 means a portion where the velocity of gas flow is made to decrease. As is obvious from FIG. 2, the flat side walls 4 of said velocity reduction chamber 1 are disposed there, opening in the forward direction, each at an angle of about 15° against the direction of progress of the effluent gas, and these flat walls are tangentially in connection with a curved or round side wall 6 surrounding the rotational symmetry region 5.

The gas flow accelerating-and-adjusting portion 2 is a portion where the velocity of gas flow, once decreased at the gas flow retardation or velocity reduction chamber 1, is increased again before the gas flow is introduced to the "irradiation zone" 3. This portion actually comprises a cylinder, existing within said rotational symmetry region 5, as a passage which directly couples the central portion of said gas flow retardation chamber 1 and the zone where electron beams are irradiated. To ensure the smooth flow of an effluent gas into the cylinder, the skirt of the cylinder takes the shape of a bellmouth inside the same. A cross-shaped baffle board 8 and a gas-flow regulating cone 9 are coaxially installed immediately below the gas flow accelerating-and-adjusting portion 2 at the bottom floor of the gas stream retardation chamber 1 in order to ensure the smooth introduction of an effluent gas into the bellmouthed edge 7 of the gas stream accelerating-and-adjusting portion, with the gas stream proceeding in rotational symmetry.

At some distance above said gas stream accelerating-and-adjusting portion 2, there is provided a reaction chamber 3. In order to balance the dose which an effluent gas receives, a plural number of equally spaced electron beam accelerators are placed around the reaction chamber 3. Referring now to the numerical symbols in the figure, 11 represents an "irradiation zone", 12 represents a central axis of the irradiation zone, 13 represents the gas stream, 14 represents the bottom floor of the gas stream retardation chamber, and 14' represents the ceiling of the gas stream retardation chamber.

Since the construction of the electron beam irradiation apparatus according to the present invention is as explained above, the effluent gas to be treated flows horizontally into the gas stream retardation chamber 1 from the left end as you face FIG. 3, wherein the gas stream is reduced in velocity and is made to rise (or go down) vertically with the aid of the guiding members such as the cross-shaped baffle board 8 and the gas flow regulating cone 9 and flows in the gas stream accelerating-and-adjusting portion 2 where the gas velocity is increased again before the gas stream reaches the irradiation vessel 3 placed immediately above (or below) said gas stream accelerating-and-adjusting portion 2. The effluent gas is then treated in the irradiation vessel under irradiation with electron beams from the plural number of electron beam accelerators as mentioned hereinbefore.

With respect to the apparatus of the present invention, if the velocity of gas stream in the gas stream retardation chamber 1, which has been reduced as a result of the increased cross-sectional area of the path of flow is represented by $v_1$, and the velocity of gas stream in the gas flow accelerating-and-adjusting portion 2 is represented by $v_2$, providing the density of the effluent gas is given by $\rho$, the relation of dynamic pressures in the gas flow retardation chamber 1 and in the gas flow accelerating-and-adjusting zone 2 can be represented by: $\frac{1}{2}\rho v_1^2 << \frac{1}{2}\rho v_2^2$. As is evident from this equation, the influence of the velocity of the gas stream in the gas stream retardation chamber 1 on the velocity of gas stream after increase in velocity is very little, and accordingly the inertia of the effluent gas in the gas stream retardation chamber 1 can be neglected. Thus, the defect which has been regarded as being inherent in the prior art apparatus has been eliminated. Namely, the adverse influence of channelling or uneven flow in the stream of an effluent gas, which is caused inevitably at a bend point of a duct, on the downstream of the same gas can be eliminated according to the above mentioned specific construction of the apparatus according to the present invention.

The gas stream accelerating-and-adjusting portion 2 is given in the shape of the rotational symmetry above the gas stream retardation chamber 1, with the inside wall of the inlet opening part of said gas stream accelerating-and-adjusting portion being in the shape of a bellmouth and both the cross-shaped baffle board 8 and the gas-flow regulating cone 9 being fixed immediately below said gas stream accelerating-and-adjusting portion 2. Such construction as mentioned above enables the smooth passing of an effluent gas through the gas-flow accelerating-and-adjusting portion 2 without being accompanied by swirling and impingement of the gas stream. In contrast to the prior art apparatuses, the apparatus of the present invention contains no bending duct, porous board, flow regulating lattice and the like. Thus, there is no surface to which aerosol particles or the like solids in the effluent gas can adhere to or deposit on, so there is no fear that part or all the various functions of the apparatus will be impaired.

Figure 4C:
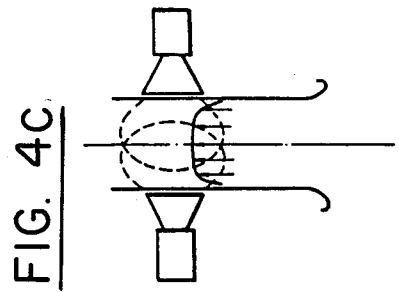
FIGS. 4a through 4c illustrate the three different ways of controlling the velocity distribution of an effluent gas stream at the entrance of the irradiation reactor.
Figure 4B:
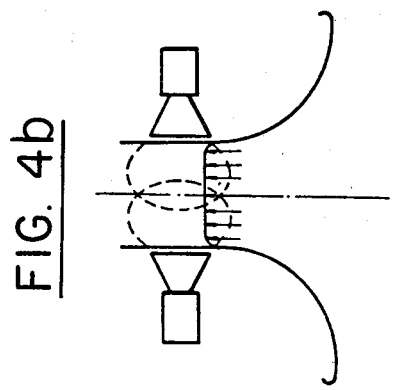
Figure 4A:
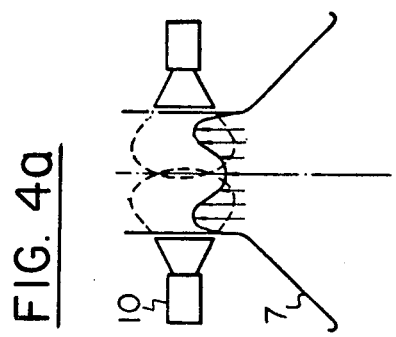

As is shown in FIG. 4a through FIG. 4c, it is possible to control the velocity distribution of gas flow in such a manner as to make it best meet with the dose rate distribution in the irradiation zone by properly selecting the shape of the approach portion (introducing duct) leading to the irradiation zone. In FIG. 4a, (7) represents the gas stream accelerating-and-adjusting portion, (10) represents an electron beam accelerator, (viii) represents the velocity distribution of gas flow, and (ix) represents the range of the spread of electron beams. For example, if the reaction vessel has a large diameter and accordingly the dose rate is low in the center area, it will be effective to gradually reduce the cross-sectional area of the flow path of the gas stream accelerating-and-adjusting portion unitil it reaches the portion immediately before the irradiation zone, as is obvious from FIG. 4a. If the diameter is such that the dose rate distribution is flat, it is desirable to gradually decrease the degree of reduction of the cross-sectional area of the flow path of the gas stream accelerating-and-adjusting portion, as it comes closer to the irradiation zone, as is shown in FIG. 4b.

If the diameter is small and the dose rate in the center area is rather high, the gas introducing duct can be a simple straight pipe as seen in FIG. 4c. (This corresponds to the shape of the effluent gas introducing duct as shown in FIG. 3). Thus, it is possible according to the present invention to control the dose rate distribution in the center area of the irradiation zone, which generally depends on the ratio of the range of electron beam to the diameter of the irradiation vessel, by changing the velocity distribution of the effluent gas by the proper selection of the shape of the gas stream accelerating-and-adjusting portion.

Heretofore, it has been considered to be difficult to treat an effluent gas under irradiation with electron beams when using such a large scale apparatus as requires an effluent gas duct having a diameter of several meters. However, the apparatus for practicing the process of the present invention for treating an effluent gas is very compact. Thus, it has become possible to carry out the treatment of an effluent gas under irradiation with electron beams advantageously.

Generally, it has been considered necessary to limit the diameter of the reactor to at most several meters in view of the maximum range of electron beam. As additional general requirements in the practice of the treatment of an effluent gas under irradiation with electron beams, satisfactory shielding must be provided and it must be possible to treat a large amount of effluent gas.

Since the present invention can fully satisfy all these requirements, it has become possible to treat an effluent gas in such large amounts as on the order of hundreds of thousands of N m³ per hour or more under irradiation with electron beams without any accompanying dead gas, counter-flow or channelling or uneven flow in the reaction vessel. In addition, since the apparatus of the present invention enables the desired control of the velocity distribution of an effluent gas so that the stream of the effluent gas may receive radiation dose uniformly, contribution of the present invention in the art of treating very large quantities of effluent gas is significant.

Figure 5:
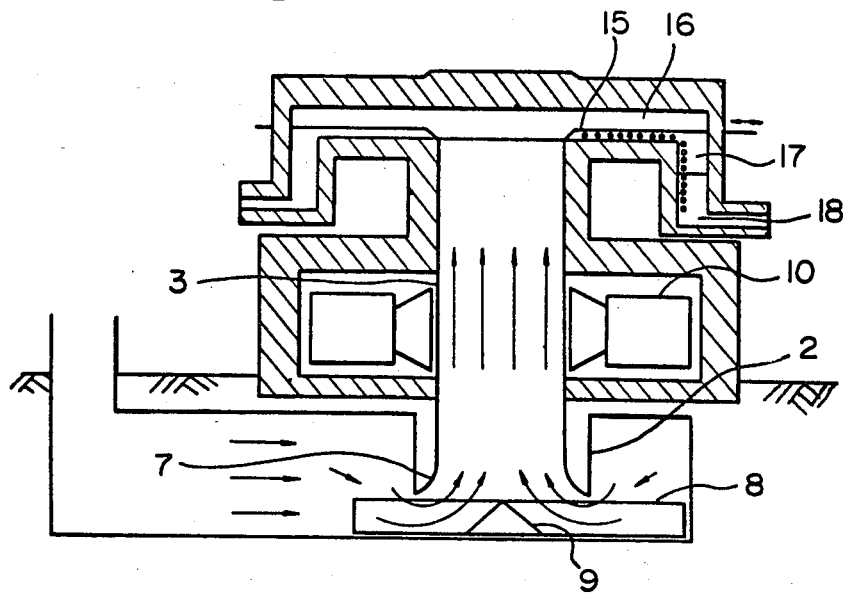
FIGS. 5 and 6 represent some of the more preferred embodiments of the apparatus for treating effluent gases according to the present invention.
Figure 6:
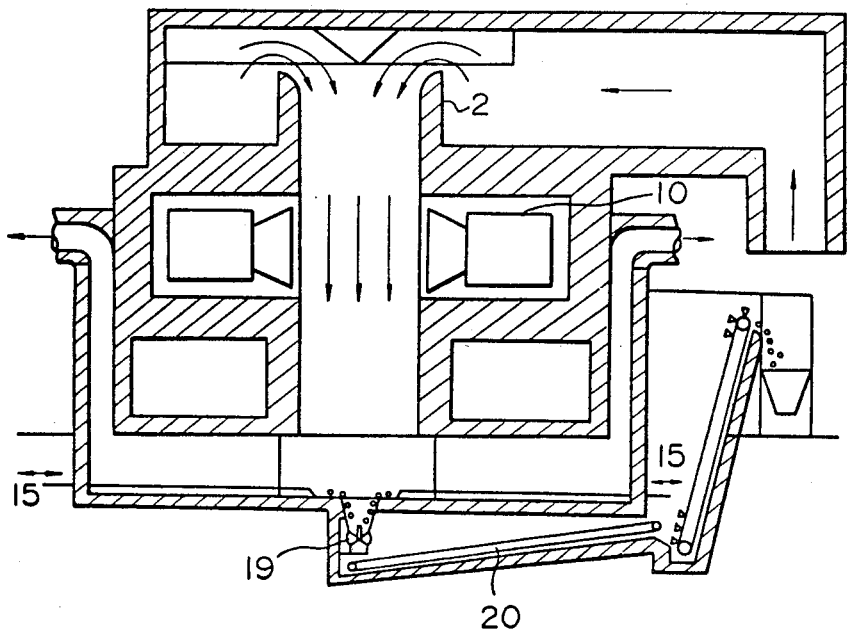

The apparatus for electron beam irradiation treatment of an effluent gas of the present invention can be used more advantageously by constructing the upper part of the irradiation chamber in such a manner as shown in FIG. 5. Namely, the effluent gas reaches the irradiation zone via the same steps as explained with respect to FIG. 2 and FIG. 3, where the effluent gas is irradiated with electron beams generated from the plural number of electron beam accelerators 10 disposed around said irradiation zone, and the irradiated effluent gas is led to the horizontal duct disposed above the reactor, the ends of the horizontal duct being bent to provide vertical ducts 17 which may be connected to dust collectors either directly or after bending again to provide the second horizontal duct portions 18 as shown in the figure. The dust deposited inside the horizontal duct 16 can be removed by the scraper(s) 15 into the dust collector(s) via the horizontal duct(s) 18. The treatment of an effluent gas by irradiation with electron beams can be carried out more advantageously by using an apparatus the construction of which is as mentioned above. Though FIG. 5 shows a case in which an effluent gas flows from down to up, it will be understood that in another case it is also possible to construct the apparatus in such a manner than an effluent gas flows from up to down as shown in FIG. 6.

The above explanation is given only for the purpose of describing the basic construction of the present invention and some of the preferred embodiments thereof. It will be understood that the present invention should not be limited to these examples and that modifications and variations can be made therefrom without departing from the scope and spirit of the invention.

Hereupon, it should be noted that the portion which has been substantially referred to in the specification and drawings as "being bent at a right angle" does not always mean that the bent portion is a perfect right angle but it means with a tolerance of ±45°.

What is claimed is:

1. A process for treating an effluent gas containing $NO_x$ and $SO_x$ under irradiation with electron beams which comprises the steps of:

introducing a stream of an effluent gas by transporting through a duct into a velocity reduction chamber wherein the velocity of the gas stream is reduced;

leading the gas stream at an angle of 90° with a tolarance of ±45° relative to the direction of flow of gas into the chamber from said velocity reduction chamber into a region in which the velocity of the gas is accelerated and the velocity distribution is adjusted to provide uniform treatment of the gas by an electron beam; and then leading the thus accelerated and adjusted gas stream into a treatment zone where electron beams are introduced in order to conduct electron beam irradiation treatment of the gas.

2. A process for treating an effluent gas under irradiation with electron beams according to claim 1 wherein the velocity of the gas stream in the treatment zone is generally uniform transverse to the direction of flow thereof.

3. A process for treating an effluent gas under irradiation with electron beams according to claims 1 or 2 further comprising the steps of directing the electron beams into the chamber from at least two directions.

4. A process for treating an effluent gas under irradiation with electron beams according to claims 1 or 2 further comprising the further step of leading the irradiated gas into a dust collection zone.

* * * * *